US010872086B2

(12) United States Patent
Moerkotte et al.

(10) Patent No.: US 10,872,086 B2
(45) Date of Patent: Dec. 22, 2020

(54) SELECTIVITY ESTIMATION FOR DATABASE QUERY PLANNING

(71) Applicant: SAP SE, Walldorf (DE)

(72) Inventors: Guido Moerkotte, Schriesheim (DE); Alexander Boehm, Schwetzingen (DE); Norman May, Karlsruhe (DE)

(73) Assignee: SAP SE, Walldorf (DE)

( * ) Notice: Subject to any disclaimer, the term of this patent is extended or adjusted under 35 U.S.C. 154(b) by 330 days.

(21) Appl. No.: 15/603,325

(22) Filed: May 23, 2017

(65) Prior Publication Data

US 2018/0341679 A1 Nov. 29, 2018

(51) Int. Cl.
*G06F 16/2453* (2019.01)
*G06F 16/2455* (2019.01)

(52) U.S. Cl.
CPC .... *G06F 16/24545* (2019.01); *G06F 16/2455* (2019.01); *G06F 16/24535* (2019.01)

(58) Field of Classification Search
None
See application file for complete search history.

(56) References Cited

U.S. PATENT DOCUMENTS

| | | | |
|---|---|---|---|
| 9,189,520 B2 | 11/2015 | May et al. | |
| 2004/0010488 A1 | 1/2004 | Chaudhuri et al. | |
| 2009/0094191 A1* | 4/2009 | Chaudhuri | G06F 16/24542 |
| 2016/0162599 A1* | 6/2016 | Dickie | G06F 16/24545 |
| | | | 707/769 |

OTHER PUBLICATIONS

Aschenbrenner, Fixing Cardinality Estimation Errors with Filtered Statistics Oct. 29, 2013, sqlpassion.at, https://www.sqlpassion.at/archive/2013/10/29/fixing-cardinality-estimation-errors-with-filtered-statistics/.*
CMU Database Group, L14—Optimizer Implementation (Part I) [CMU Database Systems Spring 2017] Mar. 2, 2017, youtube, https://www.youtube.com/watch?v=1VX1evaBv20.*
Graefe et al., The Volcano optimizer generator: extensibility and efficient search Apr. 1993, Proceedings of IEEE 9th Int'l Conference on Data Engineering, pp. 209-218.*
Cormode, Graham, et al. "Synopses for massive data: Samples, histograms, wavelets, sketches." Foundations and Trends in Databases 4.1-3 (2012): 1-296.

(Continued)

*Primary Examiner* — Jason G Liao
(74) *Attorney, Agent, or Firm* — Mintz Levin Cohn Ferris Glovsky and Popeo, P.C.

(57) ABSTRACT

A system for cardinality estimation for database query planning is provided. In some implementations, the system performs operations comprising determining, based on a first bounds and a second bounds for a combination of query predicates, whether a solution for the combination of the query predicates exists which includes both the first and second bounds. When the solution is determined to exist, the operations can further comprise determining at least one selectivity estimate for the combination of the query predicates. A query plan for execution of a database query comprising the query predicates can be generated based on the at least one selectivity estimate, and the database query can be executed through execution of the query plan. Related systems, methods, and articles of manufacture are also described.

17 Claims, 5 Drawing Sheets

(56) References Cited

OTHER PUBLICATIONS

Kastrati, Fisnik, and Guido Moerkotte. "Optimization of conjunctive predicates for main memory column stores." Proceedings of the VLDB Endowment 9.12 (2016): 1125-1136.
Markl, Volker, et al. "Consistent selectivity estimation via maximum entropy." The VLDB Journal—The International Journal on Very Large Data Bases 16.1 (2007): 55-76.
Moerkotte, Guido, et al. "Exploiting ordered dictionaries to efficiently construct histograms with q-error guarantees in SAP HANA." Proceedings of the 2014 ACM SIGMOD international conference on Management of data. ACM, 2014.

* cited by examiner

SELECTIVITY ESTIMATION FOR DATABASE QUERY PLANNING

TECHNICAL FIELD

The subject matter described herein relates to query planning for the execution of database queries, and more particularly, selectivity estimation for database query planning.

BACKGROUND

In order to efficiently execute database queries, query plans can be generated, which define the manner in which the query is executed. Efficient query planning can potentially reduce unnecessary processing time and/or the unnecessary use of processing resources. For example, in situations where the execution of an operation within a query generates a large "intermediate result" (e.g., not the final result of the entire query) and a subsequent operator within the query eliminates a large portion of this intermediate result, then the eliminated portion (or at least a subset thereof) may be regarded as "unnecessary" for the execution of the query. The generation and processing of the unnecessary intermediate results can require additional computation time and/or result in unnecessary slowdown of the execution of queries. Accordingly, it can be desirable to provide systems and methods for more efficient query plan generation for the execution of database queries.

SUMMARY

In some aspects, a method, computer program product and system are provided. In an implementation, a system capable of making selectivity estimations is provided. The system can include (or otherwise utilize) at least one processor and/or memory, which can be configured to perform operations including determining, based on a first bounds and a second bounds for a combination of query predicates, whether a solution for the combination of the query predicates exists which includes both the first and second bounds. The operations can further include determining, when the solution is determined to exist, at least one selectivity estimate for the combination of the query predicates. The operations can also include generating, based on the at least one selectivity estimate, a query plan for execution of a database query comprising the query predicates, and/or executing the database query through execution of the query plan.

In some variations, the first bound can be defined based on a plurality of cardinality estimates, and/or the second bounds can defined based on sampling and/or multi-dimensional histograms. In some implementations, the operations can further comprise correcting, when the solution is not determined to exist, one or more of the plurality of cardinality estimates until a correct solution is found. In some implementations, the operations can further comprise receiving, based on one or more histograms, the plurality of cardinality estimates. In some aspects, the at least one selectivity estimate can be calculated, in response to the first bounds and/or the second bounds being within a predetermined distance apart, based on a geometric mean of the first bounds and/or the second bounds.

In some variations, the operations can further comprise defining a plurality of subqueries from the database query, wherein a first subquery comprises the combination of the query predicates, and wherein the plurality of subqueries comprises the first subqueries. In related aspects, the operations can further comprise calculating selectivity estimates for each of the plurality of subqueries, wherein calculating the selectivity estimates comprises determining, for each of the subqueries, whether third bounds for the subquery is consistent with fourth bounds for the subquery, wherein the third bounds are based on cardinality estimates, and wherein the fourth bounds are based on sampling and/or multi-dimensional histograms.

Implementations of the current subject matter can include systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

As noted above, the generation and processing of intermediate results can require additional computation time and result in unnecessary slowdown of the execution of queries. As such, systems and methods are provided for processing calculation scenarios such that the size of intermediate results is minimized and/or processing time is decreased.

Figure 1:
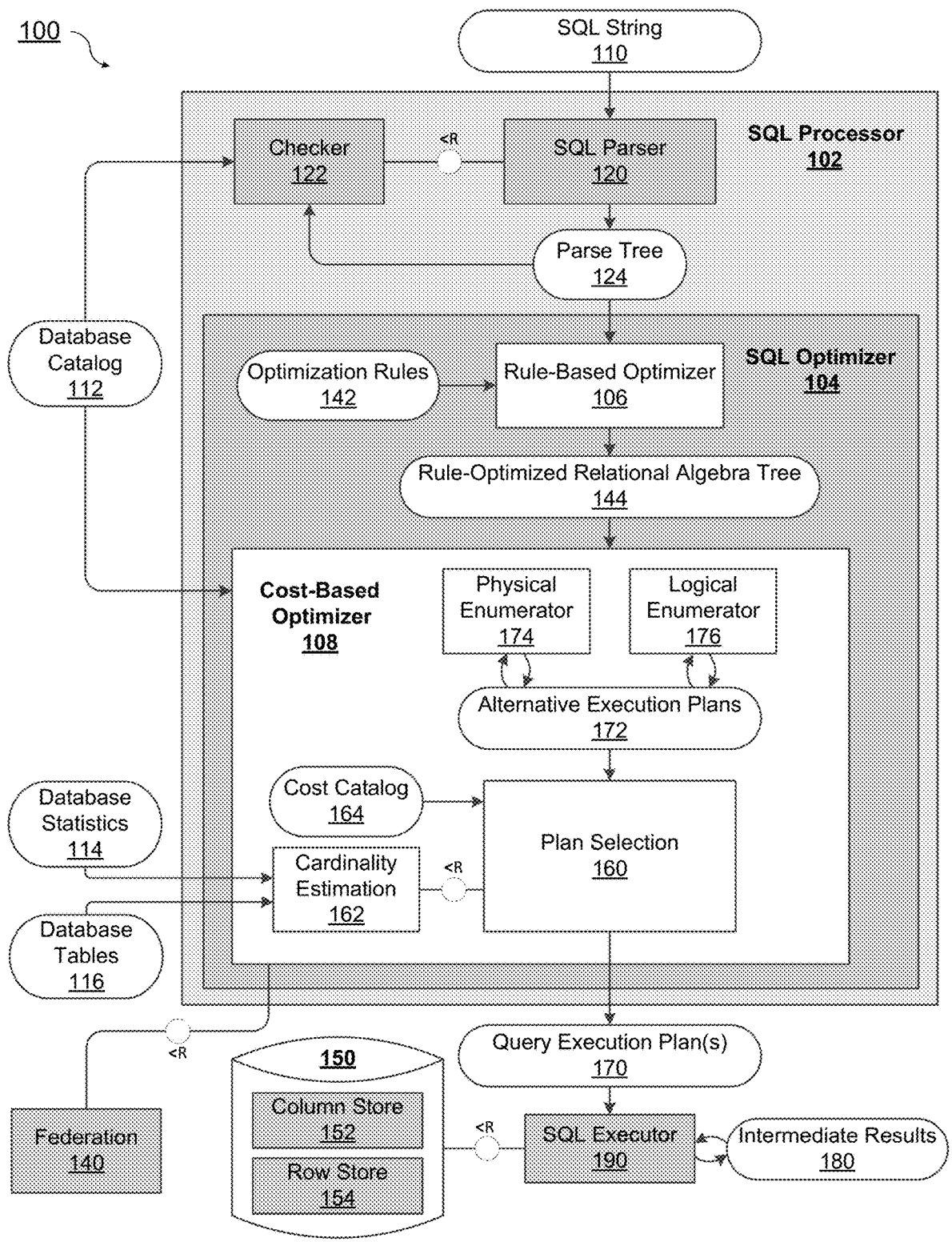
FIG. 1 depicts a functional block diagram of a system for database query processing and execution, in accordance with some example implementations.

FIG. 1 depicts a functional block diagram of a system 100 for database query processing and execution, in accordance with some example implementations. As shown, the system 100 can include a SQL processor 102, a database 150, a SQL executor 190, and/or a federation module 140. In some aspects, the SQL processer 102 can be used to implement a SQL parser 120, a checker 122, and/or a SQL optimizer 104. The SQL optimizer 104 can be used to process/handle a SQL string 110 (e.g., at least a portion of a database query) to generate one or more query execution plans 170 for execution by the SQL executor 190. In order to generate the one or more query execution plans 170, the SQL processor 102 may access and/or receive information from a database catalog 112, database statistics 114, database tables 116, and/or the like. In some aspects, one or more of the database catalog 112, database statistics 114, and database tables 116 may reside in the database 150.

In some implementations, the SQL parser 120 can check the syntactical structure of the SQL query 110 and/or generate a parse tree 124. The checker 122 can analyze the semantics of the parse tree 124 and/or determine whether issues exist, such as incompatible operations types nonexistent tables referenced therein. In some aspects, the checker 122 can utilize a database catalog 112 for these purposes. If valid, for example, the parse tree 124 can be provided to the SQL optimizer 104, which can include a rule-based optimizer 106 and/or a cost-based optimizer 108. The rule-based optimizer 106 can apply optimizations to the parse tree 124 based on the structure of the query and/or optimization rules 142 (e.g., without considering statistics or costs). A rule-optimized relational algebra tree 144 can, in turn, be provided to the cost-based optimizer 108.

The cost-based optimizer 108 can include a plan selection module 160, a cardinality estimation module 162, a physical enumerator 174, and/or logical enumerator 172. The physical enumerator 174 and/or logical enumerator 172 can generate a plurality of alternative query execution plans 172, such as by varying the physical layout and or logic of the relational algebra tree 144.

To be able to calculate costs for the alternative execution plans 172, the plan selection 160 can rely on a cost catalog 164 for cost functions. The cost functions can use cardinality estimations 162 as input. Similarly, cardinality estimation 162 can be utilized during enumeration of the alternative execution plans 172. Cardinality estimation 162 can rely on various methods and/or various data structures. For example, sampling and or histograms can be leveraged for cardinality estimation. Additionally or alternatively, the systems and methods of cardinality estimation described herein can be used.

Database queries, for which execution plans 170, 172 are generated, can request information (e.g., in the form of a result) based on one or more underlying data tables 116 (or some other structure), which may be stored within a database 150. Database queries can be defined to include a plurality of predicates, which can be defined as condition(s) under which a given portion of a data table (e.g., an entry or a tuple) satisfies a portion of the query. Such predicates can be determined and/or evaluated based on one or more views.

Plan selection 160 can pick the plan with the smallest cost generated during plan enumeration. As these costs are based on cardinality estimation 162, better cardinality estimates can provide for better plan selection 160. The chosen query execution plan 170 is passed on for execution by the SQL executor 190. In some aspects, the selected query execution plan 170 can be cached for later use (e.g., and bypass query optimization). For example, a query may ask for all rows from Table A where variable X (e.g., a value of a certain column) is greater than five and where variable Z is less than one hundred. Each of X>5 and Z<100 can be viewed as predicates of the query. If thousands of rows in Table A satisfy the predicate X>5, but only one row in Table A satisfies the predicate Z<100, then executing the X>5 predicate first can result in operating inefficiencies. For example, if the thousands of rows which satisfy the predicate X>5 are retrieved from a database 150 and/or used by a SQL executor 190 to generate intermediate results 180 for responding to this portion of the query, and then all or almost all of these intermediate results 180 are filtered out by the SQL executor 190 in the execution of the second predicate, then an unnecessary amount of intermediate results 180 may be generated by executing the X>5 predicate first.

Thus, it can be advantageous for the selector to pick the order of operations of query predicates and/or operations within the alternative execution plans 172, in order to minimize the size of intermediate results 180 and/or processing resources/time required by the SQL executor 190 for the execution of a query. Such selections can be made on the basis of cardinality estimates 162, which can be indications of the expected size of intermediate results 180 of a given query operation/predicate. As part of query plan generation, the database optimizer 104 can order query operations (e.g., predicate or combination of predicates) which are expected to generate the smallest intermediate results 180 for earlier execution than query operations which are expected to generate larger intermediate results 180. Such ordering can be performed on the basis of cardinality estimates, which can be regarded as a number of estimated tuples which are expected to be provided as a result of the execution of the operation. Accordingly, it can be desirable to provide systems and methods for accurate cardinality estimation for database query planning. As used herein, the term "tuple(s)" is intended to refer to n-tuples, wherein n can represent any non-negative integer (or some other range of values).

In some aspects, the SQL executor 190 can perform parallel execution, such that multiple procedures can be executed in parallel (e.g., until the next synchronization point). The results of query execution can be provided for storage within memory, such as the database 152, which can comprise a column store 152 and/or a row store. Although several aspects illustrated and described herein relate to SQL, additional and/or alternative domain-specific languages can be utilized.

Given a query with z predicates $p_1, \ldots, p_z$, it can be beneficial to estimate the "selectivity" of each single $p_i$ and/or some combination(s) thereof. The selectivity estimate may be a number along with an upper bounds and/or a lower bounds. However, it may not be practical to generate, to store, and/or to provide such selectivity estimates for all $2^z$ combinations of the predicates $p_1, \ldots, p_z$. Accordingly, some systems derive estimates for only some portion of the $2^z$ combinations, which can lead to less accurate selectivity estimates. Accordingly, it can be desirable to provide systems and methods for accurate selectivity estimation.

Figure 2:
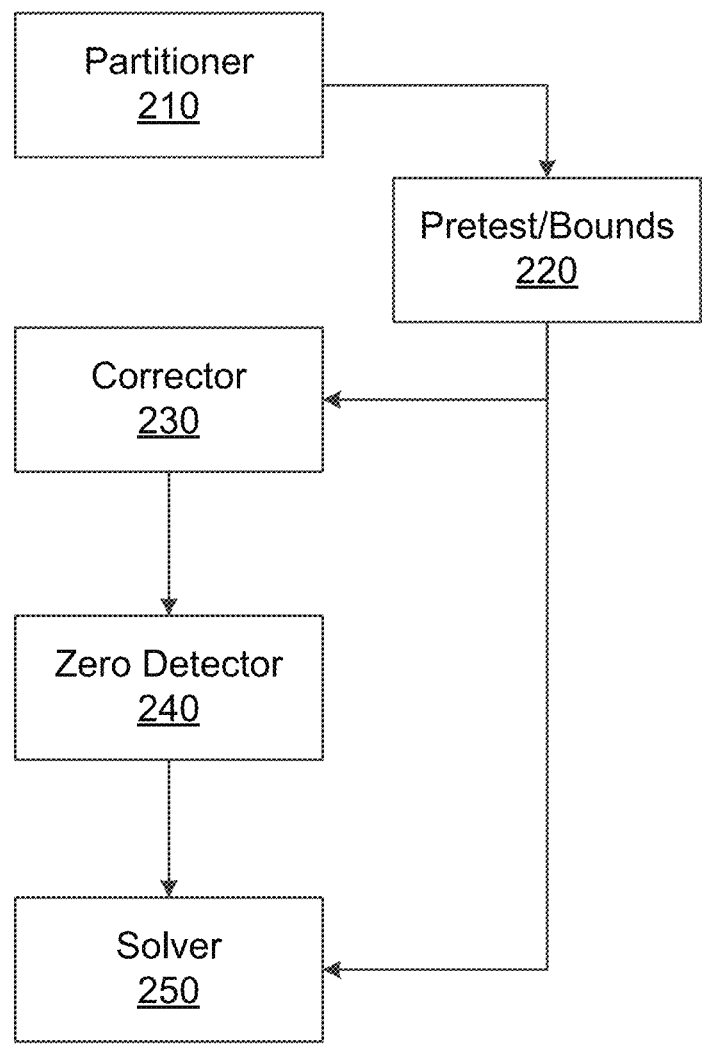
FIG. 2 depicts a functional block diagram of a system for processing (sub)queries, in accordance with some example implementations.

FIG. 2 depicts a functional block diagram of a system 200 for processing (sub)queries, in accordance with some example implementations. As illustrated, the system can include a partitioner 210, a pretest/bounds 220, a corrector 230, a zero detector 240, and a solver 250. In some aspects, one or more of the partitioner 210, pretest/bounds 220, corrector 230, zero detector 240, and solver 250 can be implemented as software functions, which can form part of a database management system. In some aspects, at least a portion of the system 200 may be regarded as providing an application of entropy maximization and/or the pretest/bounds 220 can be regarded as an optimization for an entropy maximization procedure.

The partitioner 210 can receive/take a database (sub) query as input, which can include z predicates. Because $2^z$ combinations of predicates is exponential, the partitioner 210 can generate a set of subproblems (e.g., subqueries) of treatable size. Each of these subproblems can be combinations of two or more predicates, and each may be provided as output of the partitioner 210. Each of these subproblems can, in turn, be provided as input to the pretest/bounds 220, which can determine whether each subproblem is consistent or inconsistent. The determination of what makes a given subproblem (in)consistent is described in greater detail below.

For example, a first example is illustrated in Table 1.

TABLE 1

Let $p_1 := A = 5$ and $p_2 : B = 3$
Let the query be "A = 5 AND B = 3"
And assume the selectivities:
- $Sel(p_1) = 0.5$
- $Sel(p_1$ and $p_2) = 0.6$
Then
- $beta(p_1) = p_1$ , $gamma(p_1) = p_1$ and $not(p_2)$
- $beta(p_2) = p_2$ , $gamma(p_2) = p_2$ and $not(p_1)$
- $beta(p_1$ and $p_2) = p_1$ and $P_2$ , $gamma(p_1$ and $p_2) = p_1$ and $p_2$
And the atoms can correspond to bit vectors:
- $p_1 => 10$
- $p_2 => 01$
- $p_1$ and $p_2 => 11$
Then
- $Sel(p_1) = s_{10} = x_{10} + x_{11} = 0.5$
- $Sel(p_2) = s_{01} = x_{01} + x_{11} =$ (unknown); can assign the lower bound 0 and upper bound 1
- $Sel(p_1$ and $p_2) = s_{11} = x_{11} = 0.6$
- We also have: $sel(\empty) = x_{01} + x_{10} + x_{11} = 1$ (in some aspects, all selectivities need to add up to 1)
This subproblem is inconsistent because inserting $x_{11} = 0.6$ into $x_{10} + x_{11} = 0.5$ results in $x_{10} + 0.6 = 0.5$
As $x_{10}$ must be $>= 0$ this is inconsistent Another example is illustrated in Table 2.

TABLE 2

Let $p_1 := A = 5$ and $p_2 : B = 3$
Let the query be "A = 5 AND B = 3"
And assume the selectivities:
- $Sel(p_1) = 0.5$
- $Sel(p_1$ and $p_2) = 0.6$
Then
- $beta(p_1) = p_1$ , $gamma(p_1) = p_1$ and $not(p_2)$
- $beta(p_2) = p_2$ , $gamma(p_2) = p_2$ and $not(p_1)$
- $beta(p_1$ and $p_2) = p_1$ and $p_2$ , $gamma(p_1$ and $p_2) = p_1$ and $p_2$
And the atoms can correspond to bit vectors:
- $p_1 => 10$ TABLE 2-continued

- $p_2 => 01$
- $p_1$ and $p_2 => 11$
Then
- $Sel(p_1) = s_{10} = x_{10} + x_{11} = 0.5$
- $Sel(p_2) = s_{01} = x_{01} + x_{11} =$ (unknown); can assign the lower bound 0 and upper bound 1
- $Sel(p_1$ and $p_2) = s_{11} = x_{11} = 0.6$
- We also have: $sel(\empty) = x_{01} + x_{10} + x_{11} = 1$ (in some aspects, all selectivities need to add up to 1)
Inserting $x_{11} = 0.3$ into $x_{10} + x_{11} = 0.5$ would result in $x_{10} + 0.3 = 0.5$, implying that $x_{10} = 0.2$
This implies, using $sel(\empty) = x_{01} + x_{10} + x_{11} = 1 = x_{10} + 0.2 + 0.3$, that $x_{01} = 0.5$
Thus, a refined and consistent solution can be provided with $Sel(p_2) = 0.5 + 0.3 = 0.8$ If a given subproblem is determined to be inconsistent, it can be provided as input to the corrector 230, which can correct/adjust the subproblem by manipulating one or more input estimates (e.g., cardinality estimates). This corrector 230 can be required, as subsequent steps may not be able to handle inconsistent subproblems. The corrected subproblems can be provided to the zero detector 240, which can detect and/or eliminate zero atoms from the subproblem. In some aspects, atoms can be terms in disjunctive normal form (e.g., the beta(P) and gamma(P) can be considered atoms). Zero atoms can be atoms with a selectivity zero. Zero atoms should be detected because their upper bounds is zero. As with the corrector 230, the zero detector 240 can be required for subsequent steps to work. The zero detector 240 may, in turn, provide a subproblem to the solver 250.

The solver 250 solves the subproblem, for example, by calculating a solution to the input subproblem via entropy maximization. In some implementations, system 200 can continually generate and/or process subproblems until an entire (sub)query is processed (e.g., until all subproblems are processed) and/or some other stopping point.

Figure 3A:
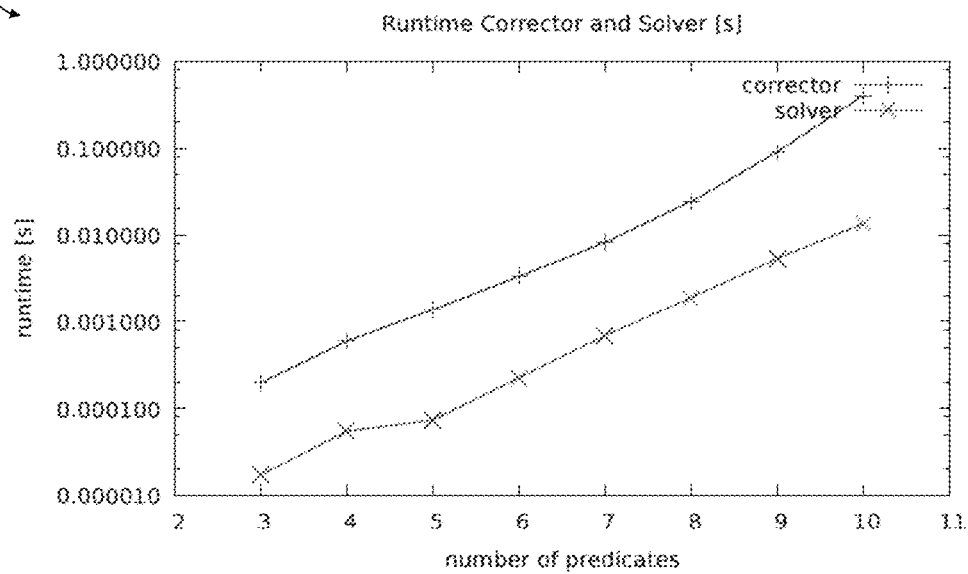
FIG. 3A depicts a graph of sample runtimes, in accordance with some example implementations.

If the pretest/bounds 220 instead determines that a subproblem is consistent, then the subproblem can be provided to the solver 250, which can bypass the corrector 230 and/or zero solver. This can be beneficial, as the runtime of the corrector 230 is generally not negligible (e.g., relative to other procedures in the system 200). For example, FIG. 3A depicts a graph 300 of sample runtimes, in accordance with some example implementations. Specifically, the graph 300 illustrates the runtime of the corrector 230 and the solver 250 of FIG. 2 with runtime in seconds along the y-axis and number of predicates along the x-axis. Compared to the runtimes of the corrector 230, the runtime of the solver 250 can be considered less "costly" (e.g., in terms of processing time and/or resources required). Accordingly, it can be beneficial to only utilize the corrector 230 when necessary.

In some aspects, the pretest/bounds 220 can include steps/procedures comprising one or more of (1) initialization of bounds x and/or b, (2) propagating the known bounds for x and/or b, (3) tightening the bounds of x and/or b, (4) detecting inconsistency, and/or (5) other steps/procedures described, such a providing the subproblem and/or bounds to the corrector 230 and/or the solver 250.

Initialization of the bounds for x and/or b can be performed by histogram techniques, cardinality estimation techniques, sampling techniques, and/or the like. For example, boundaries $x_{min}$, $x_{max}$ for $s_\gamma$ and/or $b_{min}$, $b_{max}$ for $s_\beta$ can be derived based on one or more of these techniques. In some aspects, $s_\gamma$ bounds can be regarded as bounds from sampling and/or $s_\beta$ bounds can be regarded as bounds from a histogram/cardinality estimate. In case an exact value is known for $s_\gamma$ and/or $s_\beta$, their respective upper and lower bound can coincide (e.g., can be set to equal the exact value). For those x[i], b[i] with unknown bounds (e.g., not identified via the techniques), '0' can be set as the lower bound and/or '1' can be set as the upper bound.

If $P=\{p_1, \ldots, p_z\}$ denotes a set of z predicates, then for a subset of predicates $P'\subseteq P$, predicate $\beta(P')$ and/or predicate $\gamma(P')$ can be denoted by the formulas:

$$\beta(P')=\bigwedge\nolimits_{pi \in P'}Pi$$

$$\gamma(P')=\bigwedge\nolimits_{pi \in P'}Pi \wedge \bigwedge\nolimits_{pi \notin P'}\neg Pi$$

The selectivities of these predicates can be denoted by $s_\beta(P')$ and $s_\gamma(P')$. To allow for an efficient implementation of the pretest/bounds 320, every subset $P'\subseteq P$ (or at least a portion thereof) can be expressed as bit vector bv(P') of length |P|. In some aspects, bv(P') can be interpreted as a unsigned positive integer representative of subset P'.

A design matrix C for i and j can be provided by:

$$C(i,j) = \begin{cases} 1 & \text{if } j \supseteq i \\ 0 & \text{else} \end{cases}$$

wherein $j \supseteq i$ denotes the condition that every bit set to '1' in i is also set to '1' in j.

Using C we can translate from $s_{\gamma(P')}$ to $s_{\gamma(P')}$, and using $C^{-1}$ we can translate from $s_{\beta(P')}$ to $s_{\gamma(P')}$ using:

$$Cs_{\gamma(P')}=s_{\beta(P')}$$

$$C^{-1}s_{\beta(P')}=s_{\gamma(P')}$$

Subsequently, x can be used for some $s_{\gamma(P')}$ and b can be used for some $s_{\beta(P')}$.

The propagation process for known bounds for x and/or b can include multiple steps. For example, a first step of the propagation process can include checking, for all i such that $b_{min}[i]$ is known, whether, for all $j \subset i$, the condition $b_{min}[j] \geq b_{min}[i]$ is met. In a second step, the propagation process can include checking, for all i such that $b_{max}[i]$ is known, whether, for all $j \supset i$, the condition $b_{max}[j] \leq b_{max}[i]$ is met. In a third step, the propagation process can include checking, for all j/i, whether the condition $x_{max}[j] \leq b_{max}[i]$ is met.

Tightening of the bounds and/or the inconsistency detection can be provided according to:

$$S:=\{[x,b]|Cx=b, x_{min} \leq x \leq x_{max}, b_{min} \leq b \leq b_{max}\}$$

wherein $\leq$ on vectors can be component-wise. The set of possible solutions for $s_\gamma$ and $s_\beta$ can be represented by S. If S is non-empty, then a given subproblem can be identified as "consistent." Otherwise, if S is empty, the subproblem can be identified as "inconsistent." In some aspects, S can comprise a Boolean value, such as '1' for consistent and '0' for inconsistent, or vice-versa. In some aspects, tightening the bounds may not change the set of solutions.

Figure 3B:
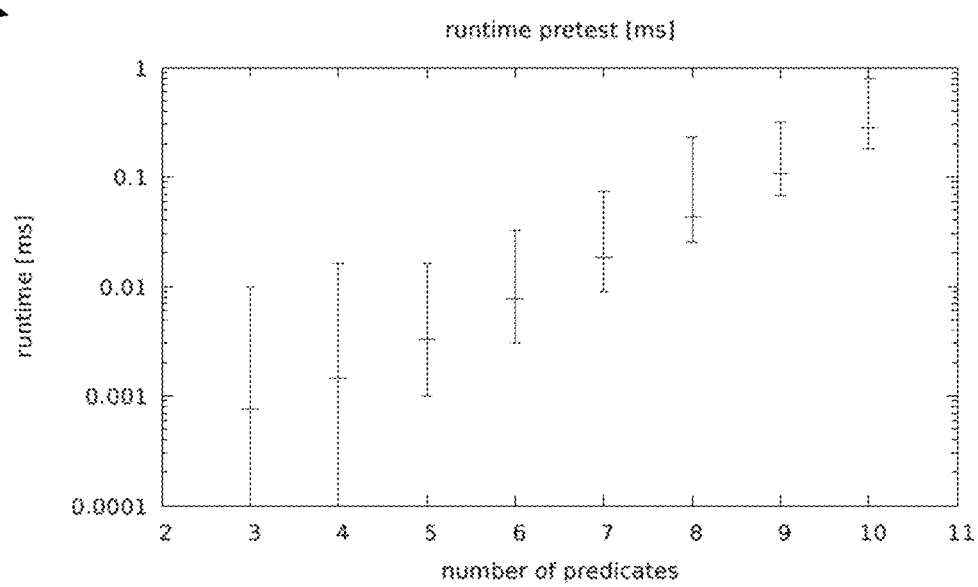
FIG. 3B depicts another graph of sample runtimes, in accordance with some example implementations.

In some aspects, the pretest/bounds can 220 quickly and/or accurately indicate whether a given set of bounds is consistent or inconsistent. For example, FIG. 3B depicts another graph 350 of sample runtimes, in accordance with some example implementations. Specifically, the graph illustrates the runtime of the pretest/bounds 220 of FIG. 2 with runtime in milliseconds along the y-axis and number of predicates along the x-axis. Compared to the runtimes of the corrector 230 and the solver 250 illustrated in FIG. 6A, the runtime of the pretest/bounds 220 can be considered negligible.

In some aspects, the pretest/bounds 220 can be configured to detect and/or handle zero atoms, which can also be considered negligible (in terms of time and/or resources required to execute). For example, the pretest/bounds 220 can calculate bounds which are tight enough to infer which of the $x_i$ components are zero. Thus, in some implementations, the zero-detector 240 can be eliminated.

In some implementations, the solver 250 can solve an input subproblem based on iterative processing. In some aspects, the pretest/bounds 220 can produce bounds for solutions to subproblems and/or derive better initial values for the solver 250, such that the solver 250 completes using fewer iterations.

Other uses of the bounds produced/identified via the pretest/bounds 220 are possible. For example, if the bounds are far apart, this is can indicate that some histograms (e.g., which can be utilized to provide cardinality estimates) are missing. Additionally or alternatively, in some implementations, if the bounds are close together, the solver 250 may be bypassed by taking a geometric mean of the bounds as the solution (e.g., estimate).

In some implementations, the pretest/bounds 220 can make use of some generally available and/or special machine instructions of the underlying processor. The naming of these instructions/operations can differ from one processor to another. For example, the standard instruction sets of many processors may supply bitwise logical operations like a bitwise not (bnot) operation, a bitwise and (band) operation, a bitwise or (bor) operation, a logical shift left (<<) operation, an addition (+) operation, a subtraction (−) operation, and/or the like.

A "special" instruction is a popcnt operation (which may be supported by many processors). The popcnt instruction can count the number of '1's in its argument, which can include 32 bit unsigned integers, 64 bit unsigned integers, and/or the like. Another special instruction which may be utilized is the pdep operation (which can be supported by the instruction set of Intel processors with BMI2 capabilities). The pdep operation can deposit the k least significant bits of an argument/input word (e.g., 32 bit unsigned integers, 64 bit unsigned integers, and/or the like) into the positions of a result, as indicated by a mask.

For example, if an argument/input is equal to "00000110" and a mask is equal to "10101010", then a result of the pdep operation can equal "00101000". The mask contains four bits set to '1' (which can be counted via a popcnt operation). Hence, the four least significant bits of the argument are deposited in the result at the places where mask contains a '1'. In order to enumerate subsets of a given set, one or more of these instructions can be utilized.

For example, if u represents a set, the all representations of subsets of u may be generated, where a '0' or '1' exists in positions of the subsets where u has a '1'. All other positions in the subsets contain a '0'. All of the representations s of non-empty true subsets of u can be efficiently enumerated based on the procedure of Table 3, where u is used as the mask in the pdep operation.

TABLE 3

```
k = popcnt(u)
e = ((1 << k) − 1)
for (i = 1; i < e; ++i)
    s = pdep(i, u)
```

Given a number of predicates z and a row number i, the procedure provided in Table 4 may be utilized to iterate over all positions j such that C[i,j]=1:

TABLE 4

```
c = bnot(i) band ((1 << z) - 1)
k = popcnt(c)
for (l = 1; l < ((1 << k) - 1); ++l)
    j = i bor pdep(l,c)
```

For the purposes of abbreviation, "for (j/i)" can be used to refer to the procedure of Table 4, which iterates over all j such that the i-th row of C contains a '1' in C[i;j].

In some implementations, the calculation of whether a given subproblem is (in)consistent can be implemented based on the procedure illustrated in Table 5.

TABLE 5

```
bool Pretest/Bounds(x_min, x_max, b_min, b_max)
    lInconsistent = false;
    lSomethingChanged = true;
    while(lSomethingChanged and not lInconsistent)
        lSomethingChanged = false;
        for(i = n-2; i >= 0; --i) // FOR EACH ROW
            lSumXmin = 0;
            lSumXmax = 0;
            for(j/i) // FOR EACH '1' in ROW i
                lSumXmin += x_min[j];
                lSumXmax += x_max[j];
            if(lSumXmin > b_max[i])
                lInconsistent = true;
            if(lSumXmax < b_min[i])
                lInconsistent = true;
            if(lSumXmin > b_min[i])
                b_min[i] = lSumXmin;
                lSomethingChanged = true;
            if(lSumXmax < b_max[i])
                b_max[i] = lSumXmax;
                lSomethingChanged = true;
            for(j/i) // FOR EACH '1' in ROW i
                lSumMin = lSumXmin - x_min[j];
                lSumMax = lSumXmax - x_max[j];
                lXmin = b_min[i] - lSumMax;
                if(lXmin > x_min[j]) {
                    lSumXmin += (lXmin - x_min[j]);
                    x_min[j] = lXmin;
                    lSomethingChanged = true;
                    if(lSumXmin > b_max[i])
                        lInconsistent = true;
                lXmax = b_max[i] - lSumMin;
                if(lXmax < x_max[j])
                    lSumXmax -= (x_max[j] -
                    lXmax);
                    x_max[j] = lXmax;
                    lSomethingChanged = true;
                        if(lSumXmax < b_min[i])
                    lInconsistent = true;
    return lInconsistent;
```

Although a specific procedures are provided in Tables 1-3, other procedures may be implemented, such as variations of these procedure which use additional/alternative information and/or utilize different programming language(s).

Figure 4:
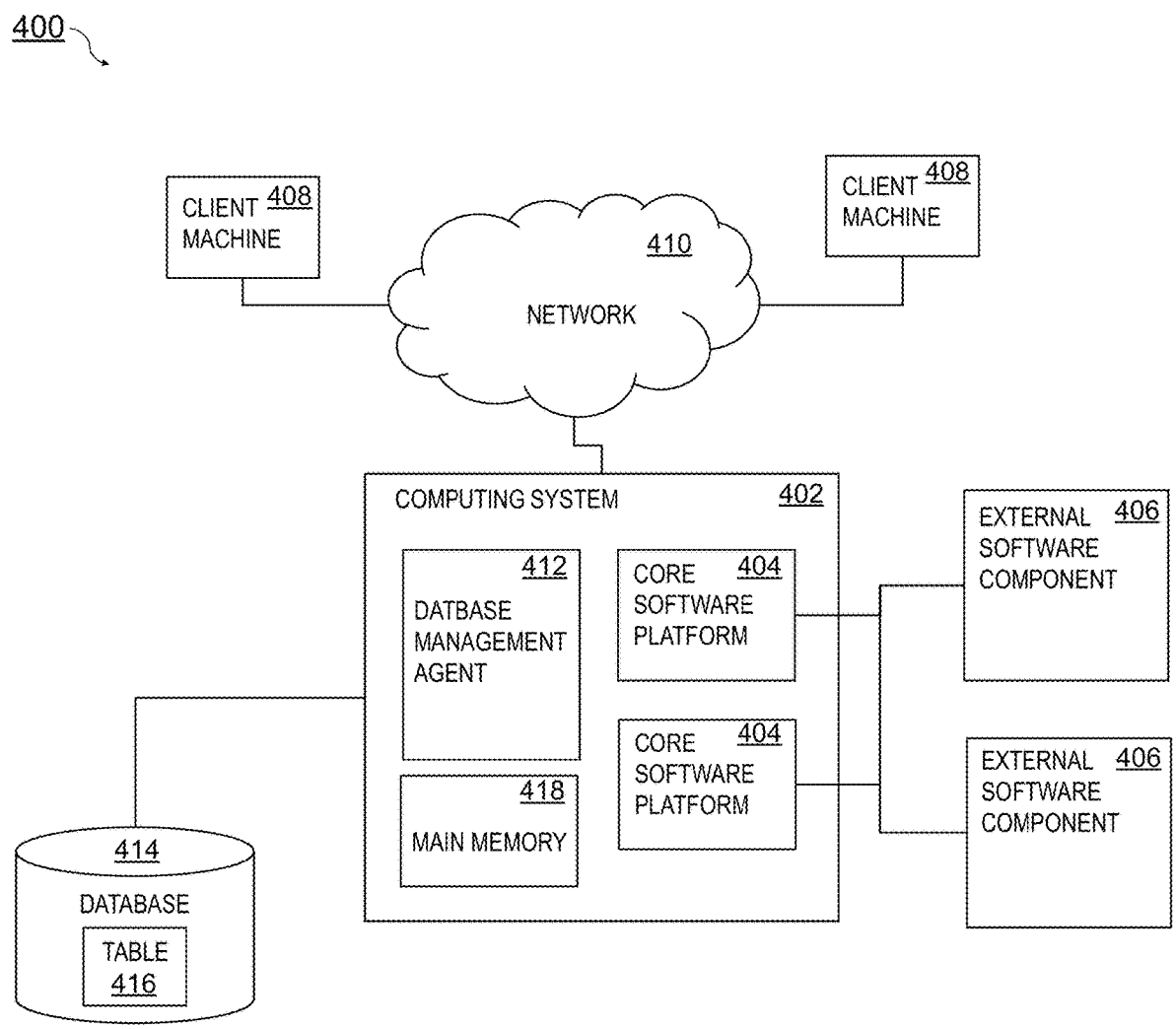
FIG. 4 depicts a database management system, in accordance with some example implementations.

FIG. 4 depicts a database management system 400, in accordance with some example implementations. As illustrated, the system 400 can include a computing system 402, one or more external software components 406, one or more client machines accessible over a network 410, and/or a database 414.

The computing system 402 may include one or more processors to execute instructions that may implement operations consistent with those described herein. Computing system 402 may include memory 418 to store executable instructions and/or information. Memory 418 may include solid-state memory, solid-state disk drives, magnetic disk drives, or any other information storage device. In some aspects, the memory 418 may provide storage for at least a portion of a database (e.g., the database 414 or some other organization of data).

The computing system 402 can include one or more core software platform modules 404 providing one or more features of a high-level programming software system or other software that includes database management features. The computing system can also aggregate or otherwise provide a gateway via which users can access functionality provided by one or more external software components 406. In some aspects, the computing system 402 can utilize one or more interfaces for communication. For example, the computing system 402 may include one or more user interface, which can include hardware or software interfaces, such as a keyboard, mouse, or other interface, some of which may include a touchscreen integrated with a display. In various implementations, user interfaces can include one or more peripheral devices and/or may be configured to communicate with these peripheral devices.

Communication among the devices in the system 400 can be through the use of direct communications, such as through the use of a wireless connection like Bluetooth, near-field communication (NFC), ZigBee, WiFi, some combination thereof, and/or the like. Additionally or alternatively, communication among the devices in the system 400 can be through the use of a hard wire connection such as universal serial bus (USB) and/or the like. Communication can additionally or alternatively occur through indirect communications, such as over a network 410, which can include a local area network, a wide area network, a wireless network, the Internet, some combination thereof, and/or the like.

Communication over the network 410 can utilize a network access device, such as a base station, a Node B, an evolved Node B (eNB), an access nodes (ANs), a hotspot, and/or the like. In some aspects, any of the client machines 408 can include personal computers, desktop computers, laptops, workstations, cell phones, digital media devices, smart phones, smart watches, PDAs (personal digital assistants), tablets, hardware/software servers, sensors, sensor devices, terminals, access terminals (ATs), mobile stations, user equipment (UE), subscriber units, and/or the like. Wired or wireless communication among the components of the system 400 can occur according to various protocols and/or access technologies (e.g., Global System for Mobile Communication (GSM), Universal Mobile Telecommunications System (UMTS), technologies developed by IEEE such as WiFi and/or Bluetooth, technologies developed by the Third Generation Partnership Project (3GPP) or 3GPP2 such as Long Term Evolution (LTE) and/or CDMA2000, etc.).

A database management agent 412 or other comparable functionality can access a database 414 that includes at least one table 416, which can in turn include at least one column and/or row. The database management agent 412 can be utilized to implement one or more of the features of implementations discussed herein. The database table 416 can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario, business process, and/or the like.

The database management agent 412 or other comparable functionality can be configured to load a database table 416, or other comparable data set, into the main memory 418. The database management agent 412 can be configured to load the information from the database 414 to the main memory 418 in response to receipt of a query instantiated by a user and/or computer system through one or more client machines 408, external software components 406, core software platforms 404, or the like. In some implementations, all, substantially all, or at least a large amount of the operational data of the database 414 can reside in-memory (e.g., in random-access memory (RAM)). Although the database 414 is illustrated as being separate and, at times, described as being separate from the computing system 402, in various implementations, at least a portion of the database 414 can be located within the computing system. The database 414 may be a column store database and/or the computing system 402 may be configured to perform OLTP (online transaction processing) and/or OLAP (online analytical processing), which can include complex analytics and tasks.

At least a portion of the illustrated system 400 may be implemented as a database management system (e.g., not including the client machines 408, the network 410, and/or the external software components 406). In some aspects, a database, as referred to herein, can be a structured, organized collection of data, such as schemas, tables, queries, reports, views, and/or the like, which may be processed for information. A database may be physically stored in a hardware server or across a plurality of hardware servers. In some aspects, a database management system may be a hardware and/or software system that interacts with a database, users, and/or other software applications for defining, creating, updating the structured data, and/or for receiving, handling, optimizing, and/or executing database queries.

Figure 5:
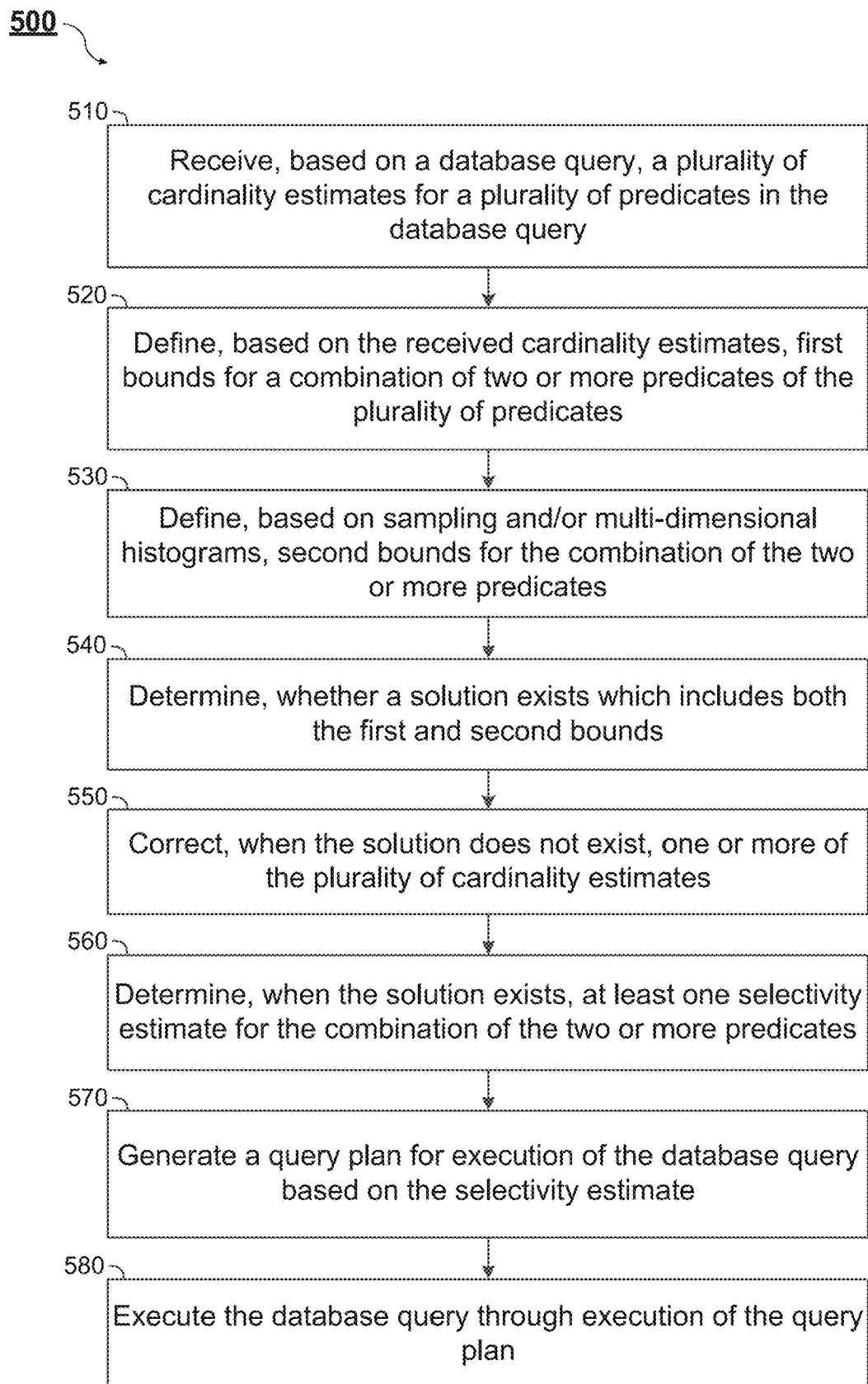
FIG. 5 depicts an example of a method for selectivity estimation for database query planning, in accordance with some example implementations.

FIG. 5 illustrates a flowchart of a method for selectivity estimation for database query planning, in accordance with some example implementations. In various implementations, the method 500 (or at least a portion thereof) may be performed by one or more of the SQL processor 102, the SQL optimizer 104, the cost-based optimizer 108, the SQL executor 190, the database 150, the system 400, the computing system 402, other systems/apparatuses, and/or some portion thereof.

Method 500 can start at operational block 510 where the SQL processor 102, for example, can receive, based on a database query, a plurality of cardinality estimates for a plurality of predicates in the database query. In some aspects, the plurality of cardinality estimates can be based on one or more histograms, for example. In some implementations, the cardinality estimates may additionally or alternatively be determined by the SQL processor 102.

Method 500 can proceed to operational block 520 where the SQL processor 102, for example, can define, based on the plurality of cardinality estimates, first bounds for a combination of two or more predicates of the plurality of predicates. For example, in some implementations, the first bounds can be defined as $s_\beta$ bounds, as described herein.

Method 500 can proceed to operational block 530 where the SQL processor 102, for example, can define, based on sampling and/or multi-dimensional histograms, second bounds for the combination of the two or more predicates. For example, in some implementations, the second bounds can be defined as $s_\gamma$ bounds, as described herein.

Method 500 can proceed to operational block 540 where the SQL processor 102, for example, can determine, whether a solution exists which includes both the first and second bounds. In various implementations, determining whether the solution exists can be similar to determining whether the $s_\beta$ bounds and the $s_\gamma$ bounds are (in)consistent, as described herein. For example, consistency can be defined according to $\{[x, b] | Cx=b, x_{min} \leq X \leq x_{max}, b_{min} \leq b \leq b_{max}\}$ and/or other various definitions provided herein.

Method 500 can proceed to operational block 550 where the SQL processor 102, for example, can correct, when the solution does not exist, one or more of the plurality of cardinality estimates. In some implementations, correcting a cardinality estimator can be similar to the correcting performed by the corrector 230. In some aspects, the correcting can include correcting one or more of the plurality of cardinality estimates until a correct solution is found (e.g., $s_\beta$ bounds and the $s_\gamma$ bounds are consistent).

Method 500 can proceed to operational block 560 where the SQL processor 102, for example, can determine, when the solution exists, at least one selectivity estimate for the combination of the two or more predicates. In some implementations, the method can additionally or alternatively include determining at least one selectivity estimate even when the solution is not determined to exist. However, in accordance with these implementations, the at least one selectivity estimate may not be determined until after correcting the one or more of the plurality of cardinality estimates.

Method 500 can proceed to operational block 570 where the SQL processor 102, for example, can generate a query plan for execution of the database query based on the selectivity estimate. For example, the SQL processor 102 can select an order of operations for each (or at least a portion) of the plurality of predicates, based on the plurality of selectivity estimates. In some aspects, when possible, predicates and/or combinations of predicates which are estimated to provide smaller intermediate results can be prioritized over (e.g., set to executed earlier than) predicates and/or combinations of predicates which are estimated to have larger intermediate results.

Method 500 can proceed to operational block 580 where the SQL processor 102, for example, can execute the database query through execution of the query plan. In some aspects, executing the query plan can include executing the one or more of the plurality of predicates on at least a portion of the underlying data (e.g., one or more database tables), in an order specified by the query plan.

In some implementations, the method 500 can include defining a plurality of subqueries from the database query, wherein a first subquery comprises the combination of the two or more predicates, and wherein the plurality of subqueries comprises the first subqueries. In some implementations, the method 500 can additionally or alternatively include calculating selectivity estimates for each of the plurality of subqueries. In some aspects, calculating the selectivity estimates can include determining, for each of the subqueries, whether third bounds for the subquery (e.g., based on the cardinality estimates) is/are consistent with fourth bounds for the subquery (e.g., based on sampling). In some implementations, the at least one selectivity estimate can be calculated based on a geometric mean of the first bounds and/or the second bounds, when the first bounds and/or the second bounds are within a predetermined distance apart (e.g., less than or equal to the predetermined distance apart).

Performance of the method 500 and/or a portion thereof can allow for more accurate selectivity estimates, which can, in turn, allow for faster database query execution. Although several aspects are described herein with respect to specific formulas, specific procedures, specific code, and/or the like other implementations are possible. For example, other procedures, which may utilize any number of programming languages, can be utilize to implement at least a portion of the described formulas, or some variation thereof.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic input, speech input, tactile input, and/or the like. Other possible input devices include touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such phrases are intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." The use of the term "based on," above and in the claims is intended to mean "based at least in part on," such that a feature or element that is not recited is also permissible.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
    at least one processor; and
    at least one memory storing instructions which, when executed by the at least one processor, cause operations comprising:
        determining that a solution is consistent for a combination of query predicates, wherein determining that the solution is consistent comprises determining that a solution set is non-empty, wherein the solution set includes a first selectivity of the combination of query predicates and a second selectivity of the combination of query predicates, wherein the first selectivity is between a first lower bound and a first upper bound, and wherein the second selectivity is between a second lower bound and a second upper bound;

in response to the first lower bound being a predetermined distance from the first upper bound and/or the second lower bound being a predetermined distance from the second upper bound, determining at least one selectivity estimate for the combination of the query predicates, wherein the at least one selectivity estimate is determined based on a geometric mean of the first lower bound and the first upper bound and/or a geometric mean of the second lower bound and the second upper bound;

generating, based on the at least one selectivity estimate, a query plan for execution of a database query comprising the query predicates; and executing the database query through execution of the query plan.

2. The system of claim 1, wherein the first lower bound and the first upper bound are defined based on a plurality of cardinality estimates, and wherein the second lower bound and the second upper bound are defined based on sampling and/or multi-dimensional histograms.

3. The system of claim 2, wherein the operations further comprise:

correcting, in response to determining that the solution is inconsistent, one or more of the plurality of cardinality estimates until the consistent solution is found.

4. The system of claim 2, wherein the operations further comprise:

receiving, based on one or more histograms, the plurality of cardinality estimates.

5. The system of claim 1, wherein the operations further comprise:

defining a plurality of subqueries from the database query, wherein a first subquery comprises the combination of the query predicates, and wherein the plurality of subqueries comprises the first subquery.

6. The system of claim 5, wherein the operations further comprise:

calculating selectivity estimates for each of the plurality of subqueries, wherein calculating the selectivity estimates comprises:

determining, for each of the subqueries, that a third lower bound and a third upper bound for the subquery is consistent with a fourth lower bound and a fourth upper bound for the subquery, wherein the third lower bound and the third upper bound are based on cardinality estimates, and wherein the fourth lower bound and the fourth upper bound are based on sampling and/or multi-dimensional histograms.

7. A method comprising:

determining that a solution is consistent for a combination of query predicates, wherein determining that the solution is consistent comprises determining that a solution set is non-empty, wherein the solution set includes a first selectivity of the combination of query predicates and a second selectivity of the combination of query predicates, wherein the first selectivity is between a first lower bound and a first upper bound, and wherein the second selectivity is between a second lower bound and a second upper bound;

in response to the first lower bound being a predetermined distance from the first upper bound and/or the second lower bound being a predetermined distance from the second upper bound, determining at least one selectivity estimate for the combination of the query predicates, wherein the at least one selectivity estimate is determined based on a geometric mean of the first lower bound and the first upper bound and/or a geometric mean of the second lower bound and the second upper bound;

generating, based on the at least one selectivity estimate, a query plan for execution of a database query comprising the query predicates; and executing the database query through execution of the query plan.

8. The method of claim 7, wherein the first lower bound and the first upper bound are defined based on a plurality of cardinality estimates, and wherein the second lower bound and the second upper bound are defined based on sampling and/or multi-dimensional histograms.

9. The method of claim 8, further comprising:

correcting, in response to determining that the solution is inconsistent, one or more of the plurality of cardinality estimates until the consistent solution is found.

10. The method of claim 7, further comprising:

defining a plurality of subqueries from the database query, wherein a first subquery comprises the combination of the query predicates, and wherein the plurality of subqueries comprises the first subquery.

11. The method of claim 10, further comprising:

calculating selectivity estimates for each of the plurality of subqueries, wherein calculating the selectivity estimates comprises:

determining, for each of the subqueries, that a third lower bound and a third upper bound for the subquery is consistent with a fourth lower bound and a fourth upper bound for the subquery, wherein the third lower bound and the third upper bound are based on cardinality estimates, and wherein the fourth lower bound and the fourth upper bound are based on sampling and/or multi-dimensional histograms.

12. A non-transitory computer-readable medium comprising instructions which, when executed by at least one processor, result in operations comprising:

determining that a solution is consistent for a combination of query predicates, wherein determining that the solution is consistent comprises determining that a solution set is non-empty, wherein the solution set includes a first selectivity of the combination of query predicates and a second selectivity of the combination of query predicates, wherein the first selectivity is between a first lower bound and a first upper bound, and wherein the second selectivity is between a second lower bound and a second upper bound;

in response to the first lower bound being a predetermined distance from the first upper bound and/or the second lower bound being a predetermined distance from the second upper bound, determining at least one selectivity estimate for the combination of the query predicates, wherein the at least one selectivity estimate is determined based on a geometric mean of the first lower bound and the first upper bound and/or a geometric mean of the second lower bound and the second upper bound;

generating, based on the at least one selectivity estimate, a query plan for execution of a database query comprising the query predicates; and executing the database query through execution of the query plan.

13. The non-transitory computer-readable medium of claim 12, wherein the first lower bound and the first upper bound are defined based on a plurality of cardinality estimates, and wherein the second lower bound and the second upper bound are defined based on sampling and/or multi-dimensional histograms.

14. The non-transitory computer-readable medium of claim 13, wherein the operations further comprise:
   correcting, in response to determining that the solution is inconsistent, one or more of the plurality of cardinality estimates until a consistent solution is found.

15. The non-transitory computer-readable medium of claim 13, wherein the operations further comprise:
   receiving, based on one or more histograms, the plurality of cardinality estimates.

16. The non-transitory computer-readable medium of claim 12, wherein the operations further comprise:
   defining a plurality of subqueries from the database query, wherein a first subquery comprises the combination of the query predicates, and wherein the plurality of subqueries comprises the first subquery.

17. The non-transitory computer-readable medium of claim 16, wherein the operations further comprise:
   calculating selectivity estimates for each of the plurality of subqueries, wherein calculating the selectivity estimates comprises:
   determining, for each of the subqueries, that a third lower bound and a third upper bound for the subquery is consistent with a fourth lower bound and a fourth upper bound for the subquery, wherein the third lower bound and the third upper bound are based on cardinality estimates, and wherein the fourth lower bound and the fourth upper bound are based on sampling and/or multi-dimensional histograms.

\* \* \* \* \*